Patented May 26, 1936

2,041,746

UNITED STATES PATENT OFFICE 2,041,746

MANUFACTURE OF ALIPHATIC ANHYDRIDES

Henry Dreyfus, London, England

No Drawing. Application August 25, 1933, Serial No. 686,734. In Great Britain September 9, 1932

12 Claims. (Cl. 260—123)

This invention relates to the manufacture of aliphatic anhydrides, and especially to the manufacture of acetic anhydride, by the thermal decomposition of the corresponding acids.

I have found that the thermal decomposition of aliphatic acids to produce aliphatic anhydrides may be catalyzed by salts of oxy-acids of phosphorus, in which the phosphorus is present in a lower state of oxidation than it is in phosphoric acid. Preferably salts of phosphorous acid, such as calcium phosphite, magnesium phosphite, etc. are employed. If desired, however, salts such as potassium hypophosphite, nickel pyrophosphite, chromic hypophosphite, or other salts of lower oxy-acids of phosphorus may be used.

The decomposition of the acid according to the invention may be effected in any convenient way. Thus for instance the acid vapor may be caused to traverse tubes charged with the catalysts of the invention heated to the required temperature. The catalysts may if desired be employed deposited on or otherwise in association with inert carriers or filling materials, such as kieselguhr, "Carborundum", asbestos, silica gel, pumice, etc., and they may also be employed together with other substances favoring the decomposition, for instance calcium tungstate.

In another method of applying the invention the acid vapors may be passed through a heated bath comprising initially one or more of the catalysts of the invention. Such a bath may consist entirely or substantially entirely of the said catalyst or catalysts, or it may contain other substances which may or may not be catalysts for the decomposition. Conveniently such a bath may comprise metals such as lead or tellurium or mixtures of metals together with one or more of the catalysts of the present invention, which may be employed either in the molten or in the solid state, according to the melting point of the catalyst and the temperature employed for the decomposition.

In yet another form of the invention the acid, containing the catalyst in suspension, may be injected or sprayed into the reaction zone. In such cases comparatively small amounts of the catalyst are required; thus the acid may contain between 0.5% and 2% of the catalyst in suspension, although other proportions may be employed.

In view especially of the readiness with which the catalysts of the invention may, generally speaking, be oxidized, it is preferable to effect the decomposition of the acid in substantial absence of oxidizing gases or vapors such as free oxygen or air. If desired, however, the acid may be decomposed in the presence of inert gases or vapors, as, for instance, nitrogen, or reducing gases or vapors, such as carbon monoxide or hydrogen.

It will usually be found advisable to preheat the acid, whether in the liquid state under elevated pressure, or in the vapor phase, also under pressure if desired, to a temperature approaching or even approximately equal to the temperature to be used for the decomposition. Such preheating may be performed in any convenient way. Thus the acid vapors may be caused to pass through tubes or pipes heated to the required temperature, or they may be passed through a preheating bath, or any other method may be employed.

The decomposition may be effected at any convenient temperature. Usually temperatures between 400° C. and 900° C., and especially between 600° and 750° C., are very useful. Any suitable type of apparatus may be employed, and such apparatus may be constructed of or lined with a metal such as copper, nickel, iron, or a nickel chromium steel, or with fireclay, fused silica, or any other suitably resistant material.

After leaving the decomposition zone, the water vapor and anhydride may be separated in any convenient way, preferably while the former at least is still in the vapor phase. For instance, the anhydride may be separated by fractional condensation as described, for example, in U. S. Patent No. 1,735,957, or the anhydride may be condensed while the water vapor is removed by means of the vapor of an entraining liquid, such as benzene, carbon tetrachloride, petroleum ether, etc. Again, the anhydride may be removed by means of a liquid in which it is soluble, but water is insoluble, such as benzene, chloroform, etc. In a modification of this process, disclosed in U. S. Patent No. 1,915,573, the vapors from the reaction zone are caused to impinge on the surface of a stream of such liquid. Another method that may be employed, described in U. S. Patent No. 1,817,614, consists in passing the reaction vapors over water binding substances such as bisulphates, pyrosulphates, zinc chloride or calcium chloride or a phosphoric acid, preferably at temperatures high enough to prevent condensation of the anhydride. Any other method of separation may, however, be employed.

The invention is in no wise limited to the manufacture of acetic anhydride, but may be applied to the manufacture of aliphatic anhydrides in general. Thus, for instance, homologues of acetic acid, such as propionic acid, butyric acid, etc., or substituted acetic acids such as methoxy acetic acid may be converted into their anhydrides by the process of the invention.

The following example illustrates the invention which is in no way limited thereby.

Example

Acetic acid is vaporized and the vapor treated to a temperature of 450° C. The hot vapor is led through a fireclay tube containing initially calcium phosphite deposited on silica gel or on pumice, and heated to a temperature of 700° C., the decomposition being effected in the absence of air. The vapors leaving the reaction tube may be treated in any convenient way to separate the acetic anhydride from the water vapor before the latter is condensed.

What I claim and desire to secure by Letters Patent is:—

1. In a process of the manufacture of lower aliphatic anhydrides by thermal decomposition of the corresponding lower aliphatic carboxylic acids, the step of catalyzing the decomposition by a salt of an oxy-acid of phosphorus, in which the phosphorus is present in a lower state of oxidation than it is in phosphoric acid, which salt is stable at the decomposition temperature.

2. Process for the manufacture of lower fatty anhydrides which comprises subjecting the corresponding acids to thermal decomposition in the presence of a salt of an oxy-acid of phosphorus in which the phosphorus is present in a lower state of oxidation than it is in phosphoric acid, which salt is stable at the decomposition temperature.

3. Process for the manufacture of acetic anhydride which comprises subjecting acetic acid to thermal decomposition in the presence of a salt of an oxy-acid of phosphorus in which the phosphorus is present in a lower state of oxidation than it is in phosphoric acid, which salt is stable at the decomposition temperature.

4. Process for the manufacture of lower aliphatic anhydrides which comprises subjecting the corresponding lower carboxylic acids to thermal decomposition in the presence of a salt of phosphorous acid, which is stable at the decomposition temperature.

5. Process for the manufacture of lower fatty anhydrides which comprises subjecting the corresponding acids to thermal decomposition in the presence of a salt of phosphorous acid which is stable at the decomposition temperature.

6. Process for the manufacture of acetic anhydride which comprises subjecting acetic acid to thermal decomposition in the presence of a salt of phosphorous acid which is stable at the decomposition temperature.

7. Process for the manufacture of lower fatty anhydrides, which comprises subjecting the corresponding acids to thermal decomposition at a temperature between 600° and 900° C. in the presence of an alkali metal salt of phosphorous acid.

8. Process for the manufacture of acetic anhydride, which comprises subjecting acetic acid to thermal decomposition at a temperature between 600° and 900° C. in the presence of an alkali metal salt of phosphorous acid.

9. Process for the manufacture of acetic anhydride, which comprises subjecting acetic acid to thermal decomposition at a temperature between 600° and 750° C. in the presence of an alkali metal salt of phosphorous acid.

10. Process for the manufacture of lower fatty anhydrides, which comprises subjecting the corresponding acids to thermal decomposition at a temperature between 600° and 900° C. in the presence of an alkaline earth metal salt of phosphorous acid.

11. Process for the manufacture of acetic anhydride, which comprises subjecting acetic acid to thermal decomposition at a temperature between 600° and 900° C. in the presence of an alkaline earth metal salt of phosphorous acid.

12. Process for the manufacture of acetic anhydride, which comprises subjecting acetic acid to thermal decomposition at a temperature between 600° and 750° C. in the presence of an alkaline earth metal salt of phosphorous acid.

HENRY DREYFUS.